Nov. 4, 1941.  L. L. SCOTT  2,261,567
INTERNAL COMBUSTION ENGINE
Filed July 13, 1939   3 Sheets-Sheet 1
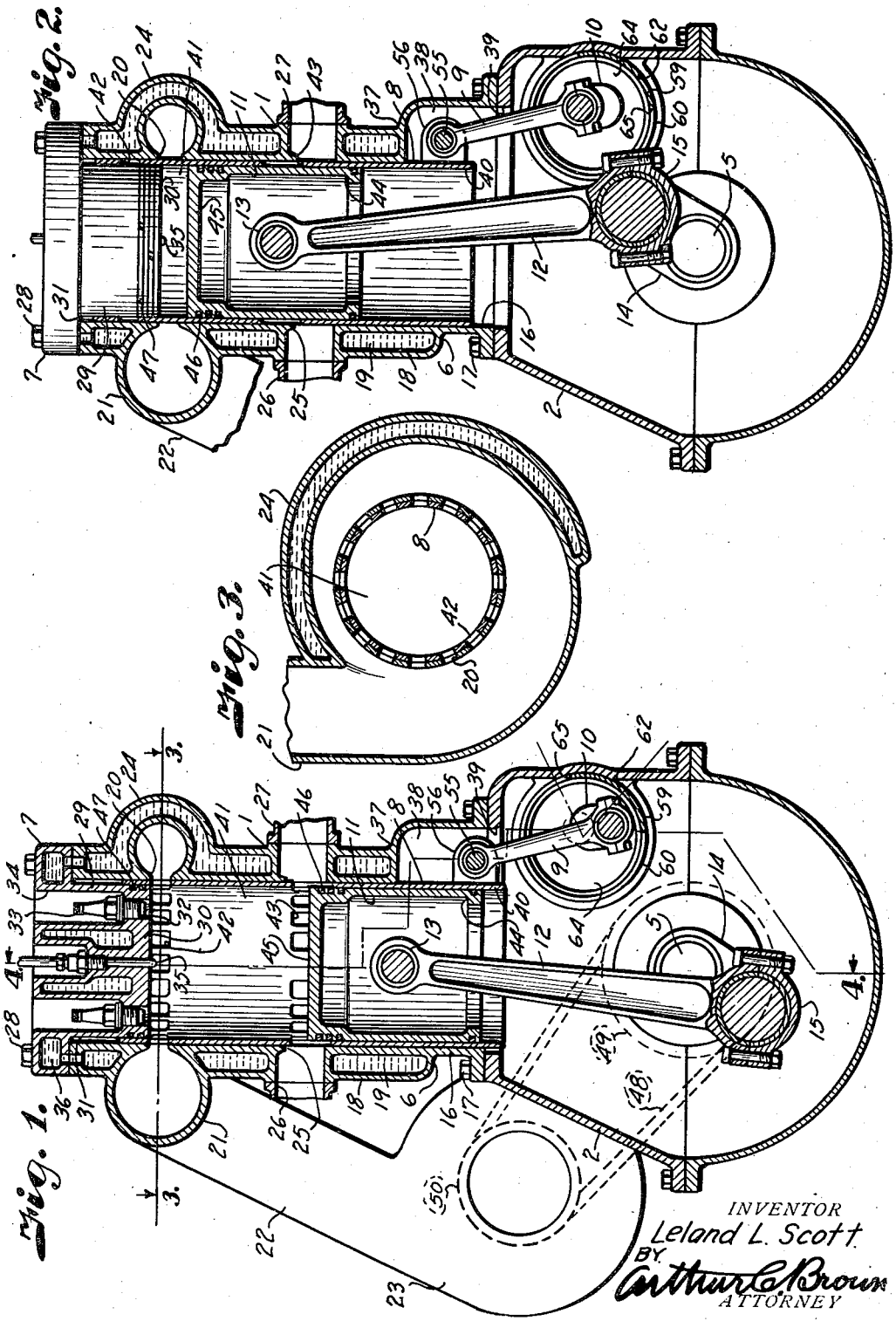
INVENTOR
Leland L. Scott
BY
Arthur C. Brown
ATTORNEY

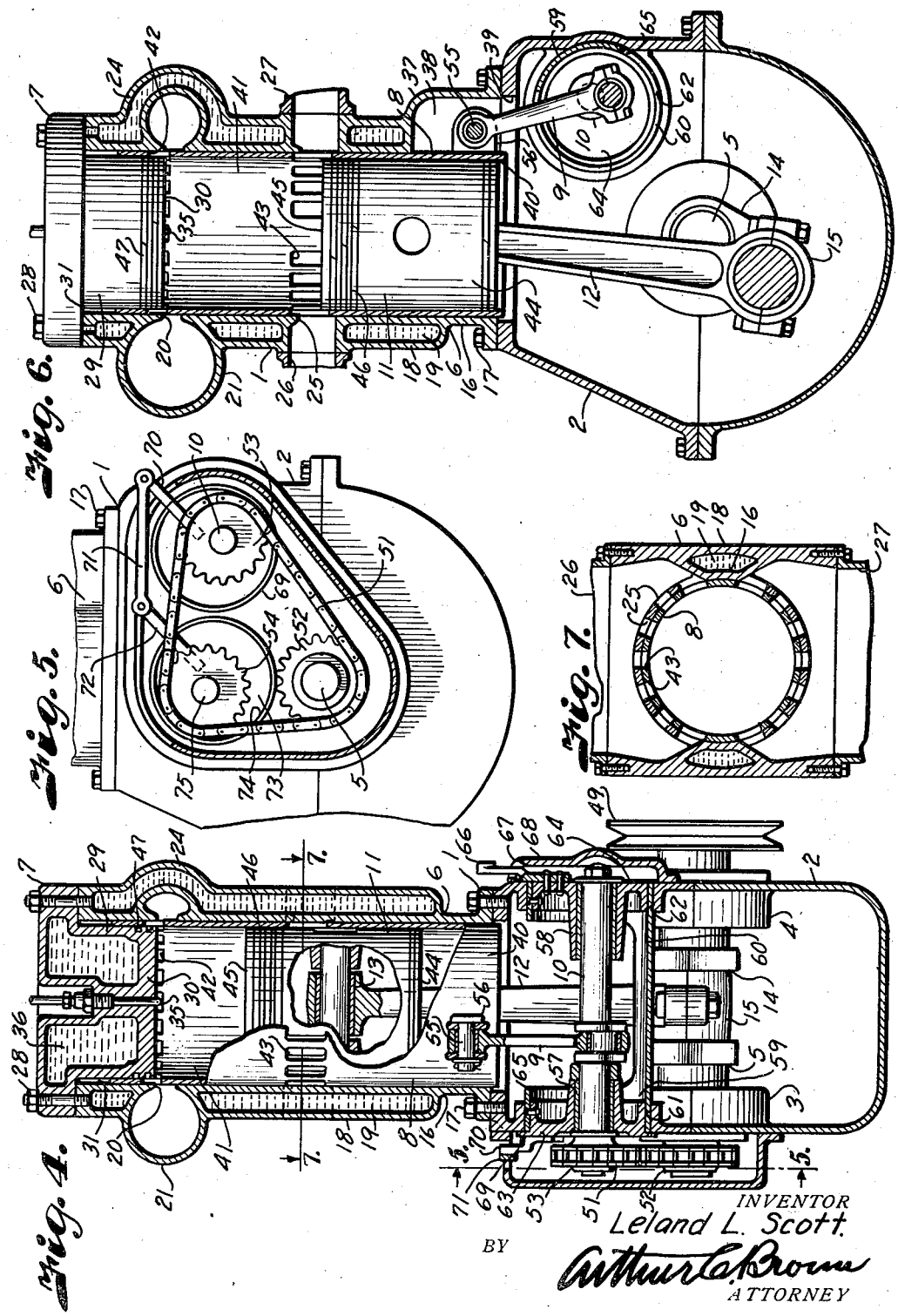

Nov. 4, 1941.　　　　　L. L. SCOTT　　　　　2,261,567
INTERNAL COMBUSTION ENGINE
Filed July 13, 1939　　　3 Sheets-Sheet 3
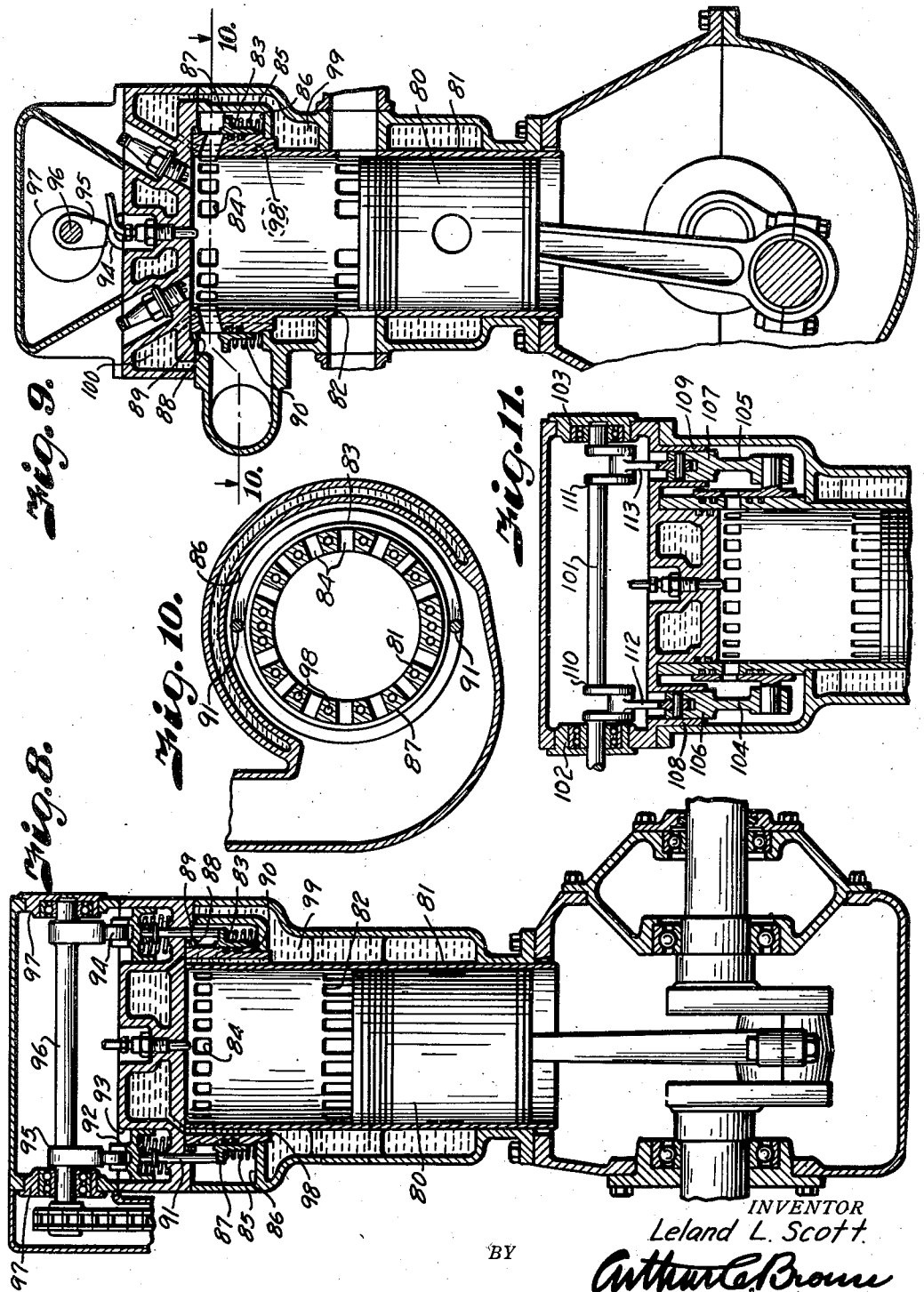
INVENTOR
Leland L. Scott.
BY Arthur C. Brown
ATTORNEY Patented Nov. 4, 1941

2,261,567

UNITED STATES PATENT OFFICE 2,261,567

INTERNAL COMBUSTION ENGINE

Leland L. Scott, Kansas City, Mo.

Application July 13, 1939, Serial No. 284,219

6 Claims. (Cl. 123—65)

This invention relates to internal combustion engines particularly of the two-cycle type wherein gases resulting from a previous combustion cycle are discharged with aid of a scavenging medium, and has for its principal object to provide an engine of this character capable of developing a smooth, even power flow through variable speed and load conditions.

Other objects of the invention are to provide selective and variable inlet of the scavenging medium so as to maintain maximum efficiency at variable engine speeds; to provide means whereby the action, time and effective area of the cylinder inlet port openings may be varied up to full port opening and the closing thereof delayed to accomplish full supercharging of the combustion chamber after the exhaust ports are closed; to provide for overvoluming or supercharging the combustion chambers with a pressure higher than atmospheric pressure thereby adapting the engine for aircraft purposes since it may be efficiently operated at high altitudes; to provide an improved inlet and exhaust port arrangement both as to effective capacity and location; and to provide a two-cycle engine construction wherein the cylinders are scavenged and supercharged preferably with air alone thereby avoiding engine failure resulting from icing conditions sometimes encountered with carbureted mixtures.

It is a further object of the invention to provide a two-cycle engine of simple construction and capable of greatest possible power output per cubic inch displacement.

A further object of the invention is to provide a two-cycle engine construction and valving arrangement which may be effectively cooled and the working temperature kept within the most efficient range.

In accomplishing these and other objects of the invention, I have provided improved details of structure, the preferred forms of which are illustrated in the accompanying drawings, wherein:

Fig. 1 is a vertical cross-section through an engine embodying the features of the present invention and showing the power piston on the beginning of the upstroke with the air intake and exhaust ports in open position.

Fig. 2 is a similar section showing the piston at the beginning of its down or power stroke with the intake and exhaust ports closed.

Fig. 3 is a horizontal section through the engine cylinder taken at the air inlet manifold on the line 3—3 of Fig. 1.

Fig. 4 is a vertical section through the engine taken on the line 4—4 of Fig. 1 and particularly illustrating the sleeve valve operating and control mechanism.

Fig. 5 is a detail section on the line 5—5 of Fig. 4 illustrating one form of drive for the sleeve valve operating shaft.

Fig. 6 is a vertical section through the engine with the piston in the same position as in Fig. 1, but showing a different relative position of the sleeve valve.

Fig. 7 is a horizontal section through the engine cylinder taken at the exhaust ports on the line 7—7 of Fig. 4.

Fig. 8 is a vertical section through an engine showing a modified form of sleeve valve actuating mechanism.

Fig. 9 is a vertical section through the modified form of engine but taken at right angles to the section shown in Fig. 8.

Fig. 10 is a horizontal section on the line 10—10 of Fig. 9.

Fig. 11 is a section through the head of an engine of the type shown in Fig. 8, but showing the sleeve valve actuated by a crank.

Referring more in detail to the drawings, and first to the form of invention shown in Figs. 1 to 7 inclusive:

1 designates a two-cycle engine embodying the features of the present invention, and which includes a crank-case 2 having bearings 3 and 4 rotatably mounting a crank-shaft 5. Supported on the crank-case 2 is a cylinder block 6 having its upper end closed by a head 7. Reciprocable in the cylinder is a sleeve valve 8 actuated by a connecting rod 9 connected with a crank-shaft 10. Operable in the sleeve 8 is a power piston 11 having operative connection with the crank-shaft 5 through a connecting rod 12 that is connected with the power piston by a wrist pin 13 and with the crank 14 of the shaft 5 by the usual connecting rod bearing 15.

The cylinder block 6 includes an inner cylindrical wall 16 having a flanged lower end seated upon and secured to the crank-case by suitable fastening devices 17. Extending circumferentially in spaced relation with the inner wall 16 is an outer wall or jacket 18 forming a passageway 19 for the circulation of a cooling medium to maintain substantially constant working temperatures as in conventional engine practice. Formed in the inner wall 16, at a point spaced below the upper end thereof, is a series of inlet ports 20 arranged entirely around the circumference of the cylinder and having connection with an inlet manifold 21 formed as a part of the cylinder block. The inlet manifold 21 has a tangential inlet connection 22 with the discharge of a blower or supercharger 23, which may be of one or more stages as later described.

In order that the pressure medium will be delivered uniformly through the respective inlet ports, the manifold is of gradually decreasing capacity from the inlet connection 22 toward the circumferential direction of the cylinder as best shown in Fig. 3. The passageway 19 is continued into the upper portion of the cylinder by a lateral extension 24 of the outer jacket or wall 18.

Also formed in the wall of the inner cylinder, at a point spaced below the inlet ports, is a similarly arranged series of exhaust ports 25 having connection with laterally extending exhaust passageways 26 and 27 on the respective sides of the cylinder block as shown in Fig. 7.

The arrangement of the ports just described allows for inlet of a pressure or scavanging medium such as air at the upper end of the cylinder for displacing spent gases from a previous power cycle through the lower exhaust ports so that the scavenging action takes place in the same direction as the gases are discharged. It is thus obvious that the scavenging medium may be quickly admitted to fill the cylinder uniformly and that the exhaust gases may be readily discharged through the exhaust ports around the entire periphery of the cylinder. The circumferential port arrangement also gives the greatest possible port capacity and assures complete scavenging and supercharging of the combustion chamber, as later described. The arrangement of the inlet ports at the upper end of the cylinder and the exhaust ports at the lower end also facilitate direct expulsion of the exhaust gases and inlet of the charging medium without loss of fuel through the exhaust ports.

The cylinder head 7 is secured to the upper end of the cylinder by fastening devices 28 and includes a cylindrical portion 29 depending within the upper end of the cylinder to form a head 30 having the surface thereof substantially registering with the plane extending through the upper edges of the inlet ports as shown in Fig. 1, the head being of smaller diameter than the inner diameter of the cylinder to provide an annular pocket 31 for guidingly receiving the upper end of the sleeve valve 8. The head portion 30 is provided with diametrically arranged openings 32 for mounting spark-plugs 33 that are threaded therein through pasasgeways 34 formed in the cylinder head. Also carried by the cylinder head, preferably in the axis thereof, is a fuel injector nozzle 35 whereby fuel is injected into the combustion chamber as later described. The cylinder head also preferably includes a water jacket 36 having connection with the water passageways of the cylinder block.

The lower portion of the cylinder block has a lateral extension 37 forming an interior recess 38 connected with the crank-case through an opening 39 for a purpose later described.

The sleeve valve includes a tubular body 40 of suitable diameter to slide freely within the cylinder in valving relation with the inlet and exhaust ports, the sleeve being of sufficient length to provide sliding support for the piston 11 and a combustion chamber 41 between the respective inlet and exhaust ports. The upper portion of the sleeve valve has a circumferential series of ports 42 adapted to register with the corresponding inlet ports 20 previously described so that the pressure or scavenging medium is admitted into the combustion chamber when the ports are in registry. Also formed in the sleeve valve in proper spaced relation below the inlet ports 42, are exhaust ports 43 registering with the corresponding exhaust ports 25 as shown in Figs. 1 and 7.

The power piston 11 is of conventional design and has the skirt portion 44 thereof movable over the exhaust ports to cooperate with the sleeve valve in controlling discharge of the spent gases of a previously combusted charge. The head 45 of the power piston is preferably formed on a plane parallel with the head 30 and slightly above the lower edges of the exhaust ports when the crank-shaft is in bottom dead center position.

The combustion chamber is sealed by conventional rings 46 on the piston and similar rings 47 on the depending portion of the cylinder head in accordance with engine practice.

The blower 23 is suitably operated to supply a pressure medium such as air at the desired pressure. In the illustrated instance the blower is driven from the crank-shaft 5 through a flexible connection such as a belt 48 operating over pulleys 49 and 50 on the crank and blower shafts respectively, as shown by the dotted lines in Fig. 1, although other geared means of blower drive may be used as is common in the art.

The sleeve valve is actuated in timed relation with the piston by means of a chain 51 operating over a sprocket 52 on the crank-shaft, a sprocket 53 on the shaft 10, and an idler sprocket 54 so that the crank of the shaft 10 effects reciprocation of the sleeve through the connecting rod 9, the connecting rod 9 being pivotally journalled on a wrist pin 55 carried by ears 56 extending laterally of the sleeve and operable in the recess 38 previously mentioned.

The operation of the engine as thus far described is as follows:

Assuming that the power piston is in the position shown in Fig. 2 and moving downwardly on the power cycle, the inlet openings 20 will be closed by the sleeve valve and the exhaust ports are closed by the skirt of the piston. During this movement the crank of the shaft 5 is swinging downwardly in a clockwise direction toward bottom dead center position while the crank of the shaft 10 is moving across top dead center position thereof but in the same direction. The sleeve valve therefore remains substantially motionless while the power piston is on the down stroke, however, as the crank of the shaft 5 approaches bottom dead center position, the piston is retarded by the time the head thereof begins to pass the exhaust ports. While the crank is moving through bottom dead center position, the power piston is relatively idle with the head thereof registering with the lower edges of the exhaust ports. Simultaneously with this latter movement of the crank-shaft 5, the crank of the shaft 10 is moving through the portion of the arc which effects downward acceleration of the sleeve valve to bring the exhaust ports in the sleeve in registry with the exhaust ports 25 and the intake ports in the sleeve in registry with the intake ports 20 so that the blower is effective in inducing pressure medium into the combustion chamber through the registering inlet ports. As the crank 14 of the shaft 5 swings from bottom dead center position, the piston quickly covers the exhaust ports, but due to lag of the crank of the shaft 10, the inlet ports of the sleeve remain in registry after the exhaust ports have been closed by the piston. Since the crank of the shaft 10 is moving across bottom dead center position, the sleeve is relatively stationary. The combustion chamber is therefore filled with pressure medium such as air up to the pressure effected by the blower 23. The crank of the shaft 10 then begins to move toward upper dead center position to move the sleeve valve quickly so that the ports therein move out of registry with the cylinder ports trapping the charge of air between the piston and cylinder heads. As the crank continues its upward movement toward top dead center position, the trapped charge is further compressed until the piston has reached the upper limit of its travel. After closure of the ports a fuel charge is injected through the nozzle 35 to form a combustible mixture with the pressure medium. As the crank-shaft 5 approaches top dead center position the combustible charge is ignited by a spark emitted from the plugs 33 so that the mixture is in burning condition by the time the piston is ready to move downwardly on its power stroke. As the piston completes the power stroke, the head thereof is moving across the exhaust ports and the sleeve valve has been moved to position for registering the ports 43 therein with the exhaust ports 25 of the cylinder so that the burnt gases are caused to escape through the exhaust passageways and a new charge of pressure medium is admitted through the registering intake ports to effect accelerated discharge of the exhaust gases. The power piston then closes the exhaust ports while the inlet ports remain open to recharge the combustion chamber.

It is thus obvious that the pressure medium is not only capable of scavenging the combustion chamber but also serves as a charging and, if desired, an over-voluming medium to maintain the desired compression pressure necessary for efficient operation of the engine.

An engine as thus far described may be designed to operate efficiently at a predetermined constant speed and compression ratio, but when the engine must be operated at differential speeds under different load conditions, it will fail to operate efficiently. For example, assuming that the engine is operating at slow speed under partially open throttle, the ratio of the charging medium relatively to the fuel will result in too lean mixture with the result that the engine will not operate smoothly at low speeds. Likewise when the engine is operating under full throttle opening and a maximum amount of fuel is admitted to the combustion chamber, an excessively rich mixture will result.

I have, therefore, provided means for selectively varying position of the sleeve valve with respect to the cylinder ports and also the movement thereof with respect to movement of the piston so that the port capacities and charging velocities may be varied so that opening of the inlet ports of the sleeve valve relatively to the inlet ports of the cylinder may be varied to provide smaller opening and quicker closing of the respective ports. For example, when the engine is operated at minimum throttle opening and the amount of fuel admitted relatively small, the inlet ports are opened only a sufficient amount and for the time necessary to introduce only enough pressure medium to scavenge only a part of the spent gases from a previous combustion cycle and leaving a part of the inert gas to maintain the necessary cylinder pressure required for smooth, efficient operation of the engine. As the throttle is further opened to increase the speed of the engine, the relative port openings are made greater, and a greater amount of pressure medium is admitted to effect scavenging of a greater amount of the spent gases but leaving a sufficient amount of inert gas which, together with the introduced pressure medium, maintains the required combustion pressure. Thus the combustion chamber can be scavenged more and more thoroughly until a point is reached where the combustion chamber is completely scavenged of all exhaust gases.

The volume of air necessary for maximum efficiency may be supplied from the blower 23 or similar supercharger as the control throttles are opened and as the advance mechanism for the sleeve valve is moved forward. After reaching a point of complete scavenging the pressure medium then becomes effective in overvoluming the combustion chamber with additional air to as high a pressure above atmosphere as is practical or desirable according to the power required and the altitude at which the engine is operated. Due to delayed closing of the inlet ports of the cylinder after closure of the exhaust ports, which action can be delayed by the variable inlet valve eccentric control to a point as long after the exhaust ports have closed as is possible or desirable to put pressure into the combustion chamber, the supercharging of the combustion chamber may be as much as two atmospheres.

It is also possible that by using a second stage supercharger or a separate supercharger which is adapted to be cut into the connection 22, the overvoluming may be increased so that the engine may be operated at high compression pressures. The additional air supply may be cut in only when desired and according to the amount of supercharging required for the various altitudes at which the engine is operated.

In effecting a selected controlled regulation of the sleeve valve with respect to movement of the power piston, I have mounted the crank-shaft 10 in bearings 57 and 58 which are eccentrically positioned in an axially oscillatable carrier 59. The carrier 59 includes a sleeve-like member 60 having its ends mounted in bearing openings 61 and 62 provided in the ends of the crank-case. Fixed in the ends of the sleeve are disk-like heads 63 and 64 carrying the eccentric bearings 57 and 58 as best shown in Fig. 4. One side of the sleeve is cut away as at 65 to accommodate throw of the connecting rod 9 and to permit of relative oscillatory movement of the carrier. Fixed to the disk 64 is an actuating arm 66 operable through a slot 67 in a cap 68 covering the bearing opening 62. The opposite disk 63 carries an annular flange 69 engageable with the side of the crank-case to prevent longitudinal movement of the carrier. Fixed to this disk is an arm 70 having connection through a link 71 with an arm 72 which is fixed to a disk 73 oscillatably mounted in a cylindrical recess 74 in the end of the crank-case. The disk 73 carries a stub shaft 75 which is offset eccentrically relative to the axis of the disk in proportion to the eccentric relation of the shaft 10 with the axis of the carrier. The idler sprocket 54 is mounted on the stub shaft 75.

When the carrier is adjusted to vary action of the sleeve valve the sprocket 53 is moved in the same relative proportion as the sprocket 52 thereby compensating for the varying distance between the axis of the respective crank-shafts and thereby maintaining taut condition of the chain 51 at all positions of the axis of the crank-shaft 10 with respect to the axis of the crank-shaft 5, or a regulation automatic chain tightener may be used for this purpose.

It is thus obvious that by oscillating the carrier in the bearing openings the throw of the crank-shaft 10 may be changed relatively to the throw of the crank 5 with the result that timing and degree of opening of the inlet ports may be varied through a predetermined range to vary the amount of scavenging and the degree of supercharging necessary to overcome the difficulties as above pointed out. For example, when the engine is operating under closed throttle, the carrier 59 may be oscillated in an anticlockwise direction from the position shown in Fig. 1 so as to raise the axis of the crank-shaft 10 relative to the axis of the crank-shaft 5. Therefore the sleeve will be correspondingly raised with respect to the cylinder so that the inlet ports operate at a higher elevation and only partially open the inlet ports in the cylinder. The exhaust ports will be correspondingly raised and will valve off greater portions of the exhaust ports in a cylinder, but the effective area thereof is sufficient to permit the desired scavenging by the air admitted through the inlet ports at the smaller opening. A part of the inert gases resulting from a previous power cycle will remain in the combustion chamber so as to maintain substantially constant compression pressure with the smaller volume of admitted air necessary in maintaining the proper volumetric ratio with the fuel supplied. As the power supply is increased with greater throttle opening, the carriage may be gradually returned to its position as shown in Fig. 1 where the inlet ports are opened to their full capacity. This shifting of the crank-shaft 10 also correspondingly varies the dead center positions of the respective cranks so that longer or shorter closing time may be maintained in substantially full open position of the inlet ports.

The modified form of the invention shown in Figs. 8 to 10 inclusive effects the same result as the preferred form. In this form the power piston 80 operates directly in contacting relation with the walls 81 of the cylinder and operates to effect full control of the exhaust ports 82. The upper end of the cylinder is designed so that the sleeve valve 83 is slidable exteriorly thereof and movable over the inlet ports 84 in one direction responsive to a coil spring 85 having one end seated against the bottom of a recess 86 formed in the cylinder block circumferentially of the cylinder. The other end of the spring engages a laterally extending flange 87 projecting from the sleeve. When the sleeve is in closed position the upper end is sealingly engaged with a packing ring 88 which is seated in an annular recess 89 of the cylinder head, and the lower end seals with expansion rings 90 inset within the cylinder below the port opening. The sleeve is moved to port opening position by rods 91 slidably mounted in bearing openings in the cylinder head and engageable by spring-pressed guide heads 92 slidably mounted in cylindrical recesses 93 in the cylinder head. Carried by the guide heads are rollers 94 which are engageable by cams 95 fixed to a shaft 96 eccentrically mounted in a shaft carrier 97 similar to the carrier illustrated and described in connection with the preferred form of the invention.

In the modified form of the invention the cam shaft is rotated by a sprocket complementary to the sprocket driving the eccentrically positioned shaft in the preferred form of the invention. It is thus obvious that rotation of the cams moves the sleeve valve from covering relation with the inlet ports in the cylinder and the spring moves the valve into covering relation with the ports. Variation in the effective port opening may be effected by changing the position of the cam shaft axis relatively to the axis of the main crank in the same manner as illustrated and described in connection with the first form of the invention.

In the modified form of the invention, Figs. 8 to 10 inclusive, the portion of the cylinder engaged by the sleeve valve may be enlarged and provided with vertical passageways 98 to connect the water jackets 99 in the lower portion of the cylinder block with the water jackets 100 in the cylinder head. The water flowing through the passageways between the ports thus cools that portion of the cylinder on which the sleeve valve operates.

As shown in Fig. 11, the short type of inlet sleeve valve may be operated directly by an overhead crank-shaft 101 mounted in eccentric bearings 102 and 103, and the sleeve may be connected by connecting rods 104 and 105 with the crossheads 106 and 107 slidable in guides 108 and 109, the cross-heads in turn being connected with the cranks 110 and 111 of the shaft by connecting rods 112 and 113.

From the foregoing it is obvious that I have provided a two-cycle engine construction which may operate efficiently at variable speeds and load conditions and that any degree of overvoluming may be effected by regulating location and movement of the sleeve valve with respect to location of the cylinder ports and movement of the power piston.

While I have illustrated an engine consisting of a single cylinder, it is obvious that a multi-cylinder engine may be constructed to operate on the same principle without departing from the spirit of the invention.

I have found that by delaying the cylinder inlet port opening time, a carbureted mixture may be used and successfully trapped within the combustion chamber without loss of fuel through the exhaust ports. Therefore such a modification comes within the scope of the present invention.

Also by raising the compression ratio, elimination of the spark-plugs, spark mechanism, and the use of heavier fuels, an engine of this design can be operated on the compression ignition and fuel injection principle.

What I claim and desire to secure by Letters Patent is:

1. An internal combustion engine including a cylinder having inlet and exhaust ports, a sleeve valve movably supported axially of the cylinder and having ports registering with the inlet ports, a power piston in the cylinder movable over the exhaust ports, a crank-shaft, a connecting rod connecting the crank-shaft with the piston, a valve actuating shaft having reciprocating means connected with the sleeve valve, a driving connection between said shafts, valve position changing means rotatably supporting the valve shaft, and means for selectively oscillating the valve position changing means to shift position of the sleeve valve whereby the extent of registry of said valve and inlet ports is variable to control flow volume of pressure medium passed through said ports.

2. An internal combustion engine including a cylinder having inlet and exhaust ports, a sleeve valve movably supported axially of the cylinder and having ports registering with the inlet ports, a power piston in the cylinder movable over the exhaust ports, a crank-shaft, a connecting rod connecting the crank-shaft with the piston, a crank-shaft having reciprocating means connected with the sleeve valve, a driving connection between said shafts, valve position changing means rotatably supporting the valve shaft, and actuating means for selectively oscillating the valve position changing means to shift position of the sleeve valve including the relative position of the cranks of said shafts whereby the extent of registry of said sleeve valve and inlet ports is variable to control flow volume of pressure medium passed through said ports.

3. An internal combustion engine including a cylinder having inlet and exhaust ports in the respective ends thereof, a sleeve valve movably supported axially of the cylinder and having inlet and exhaust ports registering with the inlet and exhaust ports of the cylinder, a power piston in the cylinder movable over the exhaust ports, a crank-shaft, a connecting rod connecting the crank-shaft with the piston, a valve actuating shaft having reciprocating means connected with the sleeve valve, a driving connection between said shafts, eccentric means rotatably supporting the valve shaft, and means for selectively oscillating the eccentric means to shift position of the sleeve valve whereby the extent of registry of said valve and inlet ports is variable to control flow volume of pressure medium passed through said ports.

4. An internal combustion engine including a cylinder having inlet and exhaust ports, a sleeve valve movably supported axially of the cylinder and having ports registering with the inlet ports, a power piston in the cylinder movable over the exhaust ports, a crank-shaft, a connecting rod connecting the crank-shaft with the piston, a valve actuating crank-shaft, a connecting rod connecting the valve actuating crank-shaft with the sleeve valve, a driving connection between said shafts, eccentric means rotatably supporting the valve actuating crank-shaft, and means for selectively oscillating the eccentric means to shift position of the sleeve valve actuating crank-shaft whereby the extent of registry of said inlet ports is variable to control flow volume of a pressure medium passed through said ports.

5. An internal combustion engine including a cylinder having inlet and exhaust ports, a sleeve valve movably supported on the cylinder and having ports registering with the inlet ports, a power piston in the cylinder movable over the exhaust ports, a crank-shaft, a connecting rod connecting the crank-shaft with the piston, a valve actuating shaft, cams on said shaft, cam followers engaged by the cams, stems interposed between the followers and the sleeve valve, a driving connection between said shafts eccentric means rotatably supporting the valve shaft, and means for selectively oscillating the eccentric means to shift position of the sleeve valve whereby the extent of registry of said valve and inlet ports is variable to control flow volume of pressure medium passed through said ports.

6. An internal combustion engine including a cylinder having inlet and exhaust ports, a sleeve valve movably supported axially of the cylinder and having ports registering with the inlet ports, a power piston in the cylinder movable over the exhaust ports, means connected with said inlet ports to supply a pressure medium to said inlet ports, a crank-shaft, a connecting rod connecting the crank-shaft with the piston, a crank-shaft having reciprocating means connected with the sleeve valve, a driving connection between said shafts, eccentric means rotatably supporting the valve shaft, and means for selectively oscillating the eccentric means to shift position of the sleeve valve including the relative position of the cranks of said shafts whereby the extent of registry of said valve and inlet ports is variable to control flow volume of the pressure medium passed through said ports.

LELAND L. SCOTT.